(12) United States Patent
Okuma et al.

(10) Patent No.: US 6,543,595 B2
(45) Date of Patent: Apr. 8, 2003

(54) DRIVING FORCE DISTRIBUTION DEVICE FOR VEHICLE

(75) Inventors: Shinji Okuma, Wako (JP); Ryuji Asada, Wako (JP); Akihiro Iwazaki, Wako (JP); Takashi Kuribayashi, Wako (JP); Tatsuhiro Tomari, Wako (JP); Masakatsu Hori, Wako (JP); Kazuhiro Wada, Wako (JP); Kiyoshi Wakamatsu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/818,974

(22) Filed: Mar. 27, 2001

(65) Prior Publication Data

US 2001/0035324 A1 Nov. 1, 2001

(30) Foreign Application Priority Data

Mar. 31, 2000 (JP) .......................................... 2000-096061

(51) Int. Cl.$^7$ ............................. F16D 19/00; H02K 49/00
(52) U.S. Cl. ...................... 192/84.1; 192/21.5; 192/48.2
(58) Field of Search ................................ 192/21.5, 84.1, 192/84.2, 84.4, 48.2, 84.3, 84.31, 84.9, 84.93

(56) References Cited

U.S. PATENT DOCUMENTS 6,230,866 B1 * 5/2001 Link ........................... 192/84.1
6,290,043 B1 * 9/2001 Ginder et al. ............... 192/21.5

* cited by examiner

*Primary Examiner*—Matthew C. Graham
(74) *Attorney, Agent, or Firm*—Carrier, Blackman & Associates, P.C.; Joseph P. Carrier; William D. Blackman

(57) ABSTRACT

A driving force distribution device which controls the engagement forces of electromagnetic clutches and which govern the torque distribution between the driving wheels of a vehicle by calculating a target magnetic flux density and converting the same into a target excitation current. Since the relationship between the target magnetic flux density and the target excitation current changes according to a decrease in the air gaps accompanying wear of the frictional engagement members of the electromagnetic clutches, a relationship between the magnetic flux density and the excitation current is determined by applying current to the electromagnetic clutches when torque distribution control is not being carried out such as when the system is started, and the target excitation current is calculated from the target magnetic flux density based on the determined relationship. Since there is no need to detect dynamic changes in the magnetic flux density, inexpensive devices can be used as magnetic flux density detecting means so contributing to a reduction in the cost.

16 Claims, 13 Drawing Sheets

DRIVING FORCE DISTRIBUTION DEVICE FOR VEHICLE

BACKGROUND OF THE INVENTION

1. Technical Field to Which the Invention Pertains

The present invention relates to a driving force distribution device for a vehicle comprising magnetic flux density detecting means for detecting the magnetic flux density which flows in electromagnetic clutches of the vehicle, current detecting means for detecting the excitation current which flows in the electromagnetic clutches, and control means for determining the target engagement forces of the electromagnetic clutches and controlling the engagement forces of the electromagnetic clutches, wherein distribution of the driving force is carried out between driving wheels of the vehicle by means of the electromagnetic clutches.

2. The Relevant Art

There is a known technique for enhancing turning performance of vehicles where the engine driving force can be distributed between the right and left driving wheels via a driving force distribution device comprising two clutches, and the driving force distributed to the outer turning wheel is increased while the driving force distributed to the inner turning wheel is decreased so as to generate a yaw moment in the turning direction. With regard to such a driving force distribution device, one in which the above-mentioned two clutches are electromagnetic clutches has already been proposed by the present inventors (see Japanese Patent Application No. 11-176651).

In the above-mentioned electromagnetic clutches of the art, a core housing a coil and an armature are placed on either side in the axial direction of frictional engagement members, and an outer guide and an inner guide for supporting the frictional engagement members in a slidable manner are placed outside and inside the frictional engagement members in the radial direction. The above-mentioned core, outer guide, armature and inner guide form a closed magnetic circuit, and a magnetic flux generated along the above-mentioned magnetic circuit by excitation of the coil attracts the armature so as to engage the frictional engagement members.

In the above-mentioned device of the art, in order to match the driving force distributions (that is to say, the engagement forces of the electromagnetic clutches) of the driving force distribution device which have been determined from the driving conditions of the vehicle such as the engine torque, engine rotational rate, vehicle speed and steering angle with the target values, the target excitation current of the above-mentioned electromagnetic clutch corresponding to the engagement force of the electromagnetic clutch is determined and feedback control is carried out so as to match the actual excitation current of the electromagnetic clutch with the above-mentioned target excitation current.

However, when the frictional engagement members of the electromagnetic clutch are worn by long-term use, so decreasing the air gap of the magnetic circuit, it causes a problem that even when the same level of excitation current is applied to the electromagnetic clutch, the magnetic flux density so generated increases, thus increasing the engagement force of the electromagnetic clutch. It is therefore necessary in the art to provide a magnetic flux density detecting means for detecting the magnetic flux density generated in the electromagnetic clutch, and also to carry out magnetic flux density feedback control so as to match the actual magnetic flux density so detected with a target magnetic flux density. Since it is necessary for the above-mentioned magnetic flux density detecting means to be of a high-precision type which can detect dynamic changes in the magnetic flux density, there is the problem that the cost rises.

SUMMARY OF THE INVENTION

The present invention has been carried out in view of the above-mentioned circumstances, and it is an object of the present invention to accurately control the engagement forces of the electromagnetic clutches which govern the distribution of the driving force without carrying out magnetic flux density feedback control requiring a high-precision magnetic flux density detecting means.

In order to achieve the above-mentioned object, in accordance with the invention, there is provided a driving force distribution device for a vehicle comprising: magnetic flux density detecting means for detecting a magnetic flux density which flows in electromagnetic clutches, current detecting means for detecting an excitation current which flows in the electromagnetic clutches, and control means for determining target engagement forces of the electromagnetic clutches and controlling the engagement forces of the electromagnetic clutches, distribution of the driving force being carried out between driving wheels of the vehicle by means of the electromagnetic clutches, wherein the control means determines a relationship between the excitation current and the magnetic flux density based on the magnetic flux detected by the magnetic flux density detecting means when a predetermined excitation current is applied to the electromagnetic clutches which are not controlled for driving force distribution, converts a target magnetic flux density corresponding to the target engagement force into a target excitation current based on the relationship between the excitation current and the magnetic flux density when the electromagnetic clutches are controlled, and carries out current feedback control so that the excitation current flowing in the electromagnetic clutches detected by the current detecting means converges to the target excitation current.

In accordance with the above-mentioned arrangement, since the relationship between the excitation current and the magnetic flux density is determined from the magnetic flux density detected by the magnetic flux density detecting means while applying a predetermined excitation current when the electromagnetic clutches are not controlled, a target magnetic flux density corresponding to the target engagement force can be converted into a target excitation current using the relationship when the electromagnetic clutches are controlled for driving force distribution. Therefore, even when the frictional engagement members of the electromagnetic clutches are worn over time, so decreasing the air gaps, the target excitation current can be determined precisely from the target magnetic flux densities at that time, and the magnetic flux density feedback control which has been needed in the art is eliminated so simplifying the control system. Moreover, since there is no need for the above-mentioned magnetic flux density detecting means to detect dynamic changes in the magnetic flux density, inexpensive devices such as, for example, search coils can be used instead so contributing to a reduction in the cost.

Search coils 34R, 34L in the embodiments correspond to the magnetic flux density detecting means of the present invention, the electronic control unit U in the embodiment corresponds to the control means of the present invention, and the front right wheel WFR and front left wheel WFL in the embodiment correspond to the driving wheels of the present invention.

The practical modes of the present invention are described below by reference to embodiments of the present invention shown in the attached drawings.

DETAILED DESCRIPTION OF THE EMBODIMENTS OF THE INVENTION

Figure 1:
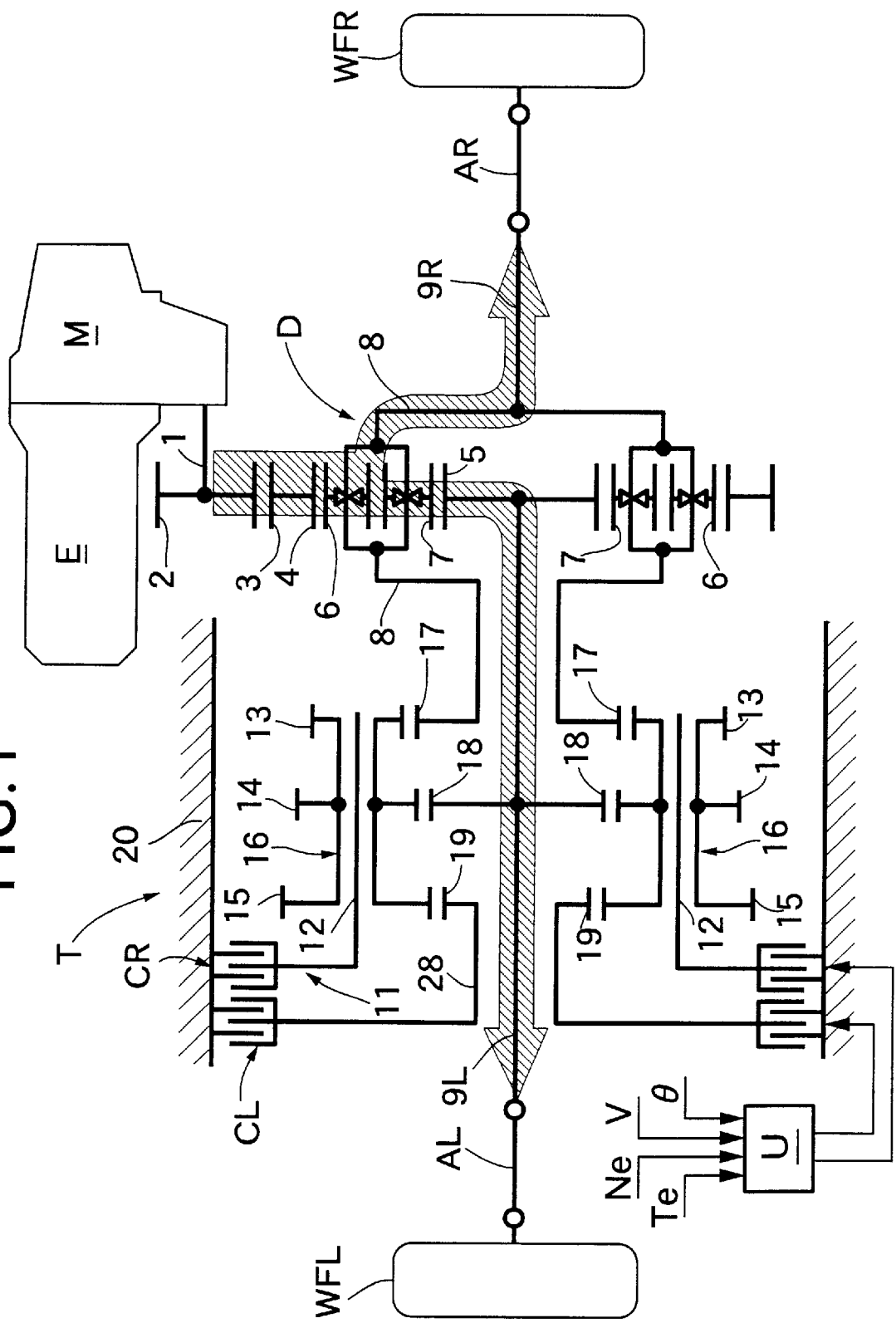
FIG. 1 is a diagram showing the structure of a driving force distribution device.

A first embodiment of the invention is described with reference to FIGS. 1–11. As shown in FIG. 1, a transmission M is connected to the right end of an engine E which is laterally mounted in the front part of the vehicle body of a front-engine/front-wheel drive vehicle, and a driving force distribution device T is placed to the rear of engine E and transmission M. A front right wheel WFR and a front left wheel WFL are connected to a right drive shaft AR and a left drive shaft AL, respectively, which extend laterally from the right end and the left end of the driving force distribution device T.

The driving force distribution device T comprises a differential D to which the torque is transmitted from an outer toothed gear 3 meshing with an input gear 2 provided on an input shaft 1 extending from the transmission M. The differential D employs a double pinion type planetary gear mechanism and comprises a ring gear 4 which is integrally formed with the above-mentioned outer toothed gear 3, a sun gear 5 which is provided coaxially inside the ring gear 4, and a planetary carrier 8 which supports outer planetary gears 6 meshing with the above-mentioned ring gear 4 and inner planetary gears 7 meshing with the above-mentioned sun gear 5 in a state in which they are meshed with each other. In the differential D, the ring gear 4 functions as an input element, while the sun gear 5, which functions as one of the output elements, is connected to the front left wheel WFL via a left output shaft 9L and the planetary carrier 8, which functions as the other of the output elements, is connected to the front right wheel WFR via a right output shaft 9R.

A carrier member 11 which is rotatably supported on the outer circumference of the left output shaft 9L comprises four pinion shafts 12 provided in the circumferential direction at 90° intervals, and each pinion shaft 12 supports in a rotatable manner a triad pinion member 16 in which a first pinion 13, a second pinion 14 and a third pinion 15 are integrally formed.

A first sun gear 17 meshing with the above-mentioned first pinion 13, which is supported in rotatable manner on the outer circumference of the left output shaft 9L, is linked to the planetary carrier 8 of the differential D. A second sun gear 18 which is fixed on the outer circumference of the left output shaft 9L meshes with the above-mentioned second pinion 14. Furthermore, a third sun gear 19 which is supported in a rotatable manner on the outer circumference of the left output shaft 9L meshes with the above-mentioned third pinion 15.

The numbers of teeth of the first pinion 13, the second pinion 14, the third pinion 15, the first sun gear 17, the second sun gear 18 and the third sun gear 19 in the embodiment are as follows.

| | |
|---|---|
| Number of teeth of the first pinion 13 | Zb = 17 |
| Number of teeth of the second pinion 14 | Zd = 17 |
| Number of teeth of the third pinion 15 | Zf = 34 |
| Number of teeth of the first sun gear 17 | Za = 32 |
| Number of teeth of the second sun gear 18 | Zc = 28 |
| Number of teeth of the third sun gear 19 | Ze = 32 |

The third sun gear 19 can be connected to a housing 20 via a left electromagnetic clutch CL, and the rotational rate of the carrier member 11 is increased by engagement of the left electromagnetic clutch CL. The carrier member 11 can be connected to the housing 20 via a right electromagnetic clutch CR, and the rotational rate of the carrier member 11 is reduced by engagement of the right electromagnetic clutch CR. The above-mentioned right electromagnetic clutch CR and left electromagnetic clutch CL are controlled by an electronic control unit U which contains a microcomputer.

The electronic control unit U processes the engine torque Te, the engine rotational rate Ne, the vehicle speed V and the steering angle θ based on a predetermined program, thereby controlling the above-mentioned right electromagnetic clutch CR and left electromagnetic clutch CL.

Figure 2:
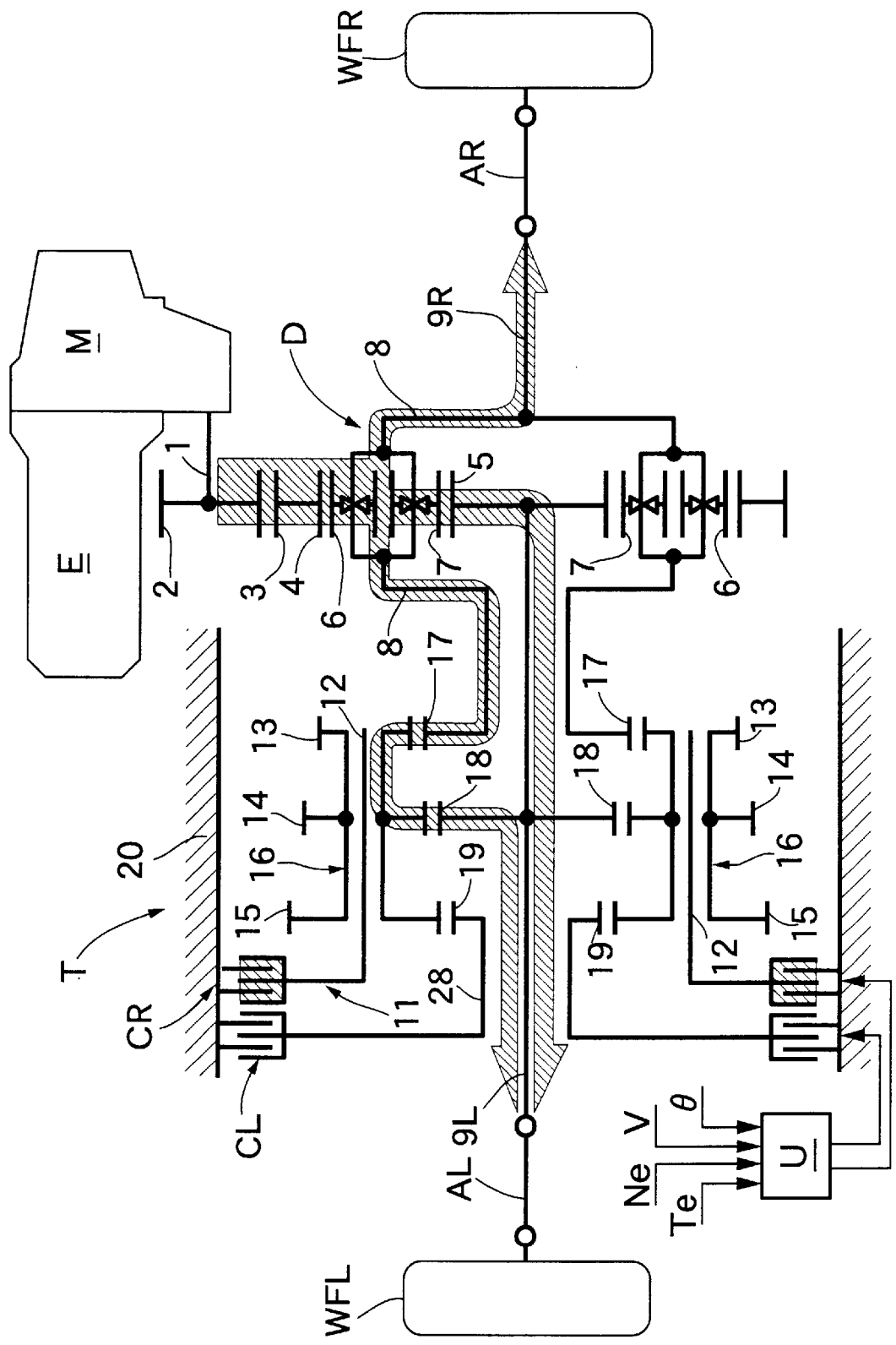
FIG. 2 is a diagram showing the action of the driving force distribution device when the vehicle is turning right at a medium to low speed.

When the vehicle is turning right at a medium to low speed, as shown in FIG. 2, the right electromagnetic clutch CR is engaged according to a command from the electronic control unit U so as to stop rotation of the carrier member 11 by connecting it to the housing 20. At this time, since the left output shaft 9L which is integrated with the front left wheel WFL and the right output shaft 9R which is integrated with the front right wheel WFR (that is to say, the planetary carrier 8 of the differential D) are linked via the second sun gear 18, the second pinion 14, the first pinion 13 and the first sun gear 17, the rotational rate NL of the front left wheel WFL is increased relative to the rotational rate NR of the front right wheel WFR according to the relationship shown in the equation below.

$$NL/NR = (Zd/Zc) \times (Za/Zb) \qquad (1)$$
$$= 1.143$$

When the rotational rate NL of the front left wheel WFL is increased relative to the rotational rate NR of the front right wheel WFR as above-mentioned, a proportion of the torque of the front right wheel WFR which is the inner turning wheel can be transmitted to the front left wheel WFL which is the outer turning wheel as shown by the hatched arrow in FIG. 2.

If, instead of stopping the carrier member 11 by means of the right electromagnetic clutch CR, the rotational rate of the carrier member 11 is reduced by appropriately adjusting the engagement force of the right electromagnetic clutch CR, the rotational rate NL of the front left wheel WFL can be increased relative to the rotational rate NR of the front right wheel WFR according to the reduction, and the required level of torque can be transferred from the front right wheel WFR which is the inner turning wheel to the front left wheel WFL which is the outer turning wheel.

Figure 3:
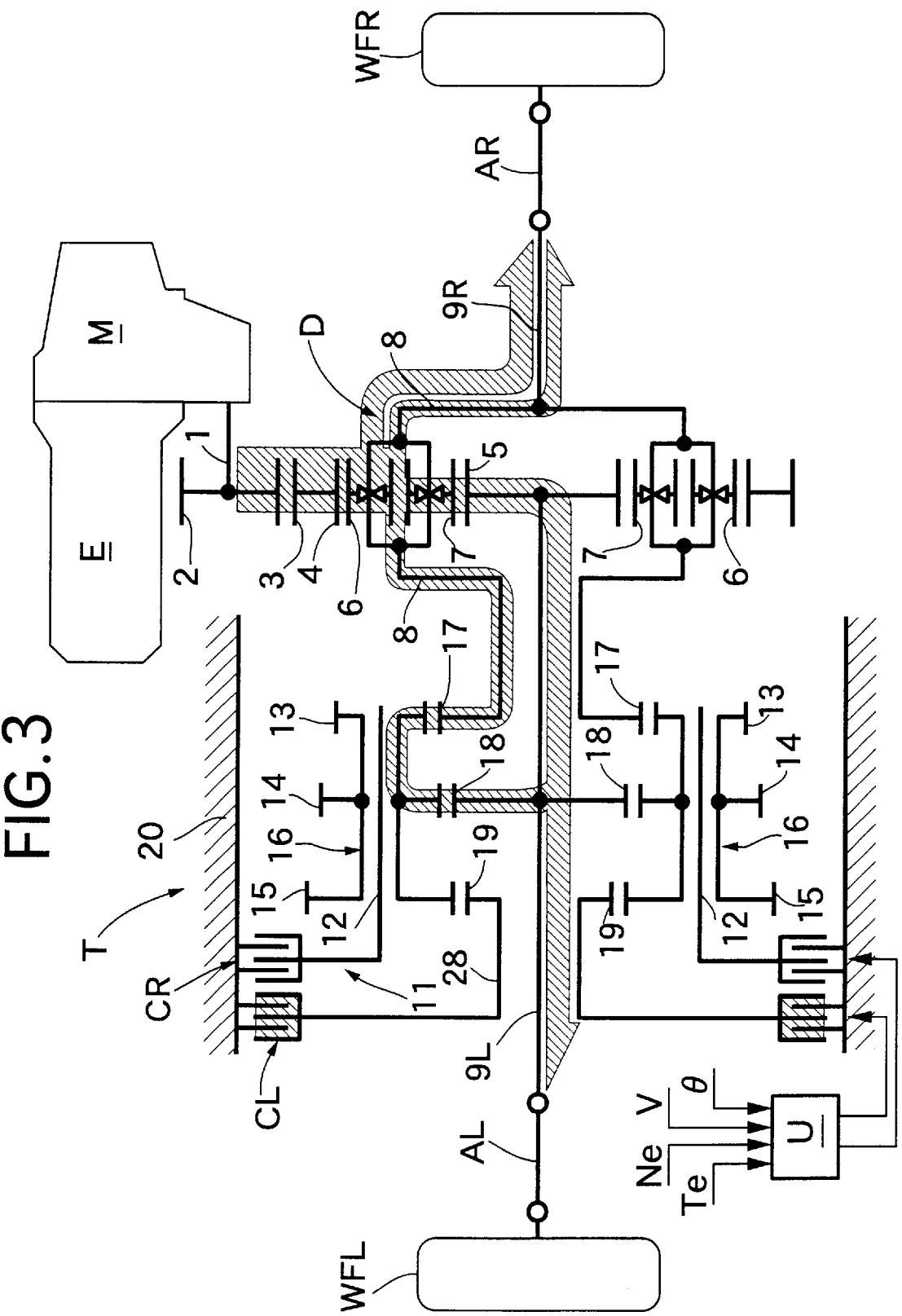
FIG. 3 is a diagram showing the action of the driving force distribution device when the vehicle is turning left at a medium to low speed.

On the other hand, when the vehicle is turning left at a medium to low speed, as shown in FIG. 3 the left electromagnetic clutch CL is engaged according to a command from the electronic control unit U and the third pinion 15 is connected to the housing 20 via the third sun gear 19. As a result, the rotational rate of the carrier member 11 increases relative to the rotational rate of the left output shaft 9L, and the rotational rate NR of the front right wheel WFR is increased relative to the rotational rate NL of the front left wheel WFL in accordance with the relationship shown in the equation below.

$$NR/NL = \{1 - (Ze/Zf) \times (Zb/Za)\} \div \{1 - (Ze/Zf) \times (Zd/Zc)\} \quad (2)$$
$$= 1.167$$

As mentioned above, when the rotational rate NR of the front right wheel WFR increases relative to the rotational rate NL of the front left wheel WFL, a proportion of the torque of the front left wheel WFL which is the inner turning wheel can be transmitted to the front right wheel WFR which is the outer turning wheel as shown by the hatched arrow in FIG. 3. In this case also, if the rotational rate of the carrier member 11 is increased by appropriately adjusting the engagement force of the left electromagnetic clutch CL, the rotational rate NR of the front right wheel WFR can be increased relative to the rotational rate NL of the front left wheel WFL according to the increase, and the required level of torque can be transferred from the front, inner turning left wheel WFL to the front, outer turning right wheel WFR. It is thus possible to enhance the turning performance by transmitting a larger torque to the outer turning wheel than to the inner turning wheel at times when the vehicle is travelling at a medium to low speed. In addition, when the vehicle is travelling at a high speed it is possible to enhance the stability of travel by lessening the torque transmitted to the outer turning wheel in comparison with the above-mentioned case of a medium to low speed or alternatively by transferring torque from the outer turning wheel to the inner turning wheel.

As is clear from a comparison of equation (1) with equation (2), since the numbers of teeth of the first pinion 13, the second pinion 14, the third pinion 15, the first sun gear 17, the second sun gear 18 and the third sun gear 19 are set as above-mentioned, the percentage increase in rotational rate (about 1.143) of the front left wheel WFL over the front right wheel WFR can be made almost equal to the percentage increase in rotational rate (about 1.167) of the front right wheel WFR over the front left wheel WFL.

Next, an explanation of the structure of the right and left electromagnetic clutches CR and CL is given based on FIG. 4 to FIG. 7.

The right and left electromagnetic clutches CR and CL which are placed adjacent to each other inside the housing 20 which is formed from a non-magnetic material such as an aluminium alloy have symmetrical structures relative to a plane of symmetry P which is orthogonal to the axis L of the right and left output shafts 9R and 9L. The right and left electromagnetic clutches CR and CL comprise a common core 21 which is made from a magnetic material in an almost cylindrical form, and the core 21 is fitted to the inner circumference of the cylindrical housing 20 and fixed by means of two bolts 22 and 22 so that it cannot move in either the circumferential or axial direction. The axially left-hand end part of the core 21 has windings of an excitation coil 23L and a search coil 34L of the left electromagnetic clutch CL and the axially right-hand end part of the core 21 has windings of an excitation coil 23R and search coil 34R of the right electromagnetic clutch CR. The search coils 34R and 34L form the magnetic flux density detecting means of the present invention.

An annular outer guide 24L and an annular inner guide 25L which are made from a magnetic material are placed coaxially on the left-hand side of the core 21. The outer circumference of the outer guide 24L is spline-bonded (26L) to the inner circumference of the housing 20 in a circumferentially immovable but axially movable manner, and the inner circumference of the inner guide 25L is spline-bonded (27L) to the left end outer circumference of a sleeve 28 which is integral with the third sun gear 19 (see FIG. 1) in a circumferentially immovable but axially movable manner. The left end face of the core 21 is in contact with an annular pressure plate 29L which is made from a non-magnetic material in order to prevent any load from acting on the excitation coil 23L in the axial direction.

Six outer discs 30L . . . are spline-bonded to the inner circumference of the outer guide 24L in a circumferentially immovable but axially movable manner on the left-hand side of the pressure plate 29L, and five inner discs 31L . . . which are alternately interposed between the above-mentioned six outer discs 30L . . . are spline-bonded to the outer circumference of the inner guide 25L in a circumferentially immovable but axially movable manner. An annular armature 32L made from a magnetic material is placed in an axially movable manner on the left-hand side of the leftmost outer disc 30L. The leftward movement of the armature 32L is restrained by a clip 33L which is fastened to the inner circumference of the housing 20, and the armature 32L can move in the axial direction between the position at which it is in contact with the clip 33L and the rightward position therefrom at which the outer discs 30L . . . and the inner discs 31L . . . are in close contact with each other.

Similarly, an annular outer guide 24R and an annular inner guide 25R which are made from a magnetic material are placed coaxially on the right-hand side of the core 21. The outer circumference of the outer guide 24R is spline-bonded (26R) to the inner circumference of the housing 20 in a circumferentially immovable but axially movable manner, and the inner circumference of the inner guide 25R is spline-bonded (27R) to the left end outer circumference of the carrier member 11 in a circumferentially immovable but axially movable manner. The right end face of the core 21 is in contact with an annular pressure plate 29R which is made from a non-magnetic material in order to prevent any load from acting on the excitation coil 23R in the axial direction.

Six outer discs 30R . . . are spline-bonded to the inner circumference of the outer guide 24R in a circumferentially immovable but axially movable manner on the right-hand side of the pressure plate 29R, and five inner discs 31R . . .

which are alternately interposed between the above-mentioned six outer discs 30R . . . are spline-bonded to the outer circumference of the inner guide 25R in a circumferentially immovable but axially movable manner. An annular armature 32R made from a magnetic material is placed in an axially movable manner on the right-hand side of the rightmost outer disc 30R. The rightward movement of the armature 32R is restrained by a clip 33R which is fastened to the inner circumference of the housing 20, and the armature 32R can move in the axial direction between the position at which it is in contact with the clip 33R and the leftward position therefrom at which the outer discs 30R . . . and the inner discs 31R . . . are in close contact with each other.

The above-mentioned outer discs 30R . . . and 30L . . . and inner discs 31R . . . and 31L . . . are made from a non-magnetic material such as stainless steel, and clutch facings (not illustrated) are bonded to the surfaces of one set of discs (for example, the inner discs 31R . . . or 31L . . . ), the clutch facings being in contact with the surfaces of the other set of discs (for example, the outer discs 30R . . . or 30L . . . ).

A connector 42 is provided so as to run through the housing 20 and the core 21, current is applied to the right and left excitation coils 23R and 23L via the connector 42 and the induced electromotive forces detected by the right and left search coils 34R and 34L are taken out via the connector 42.

Figure 4:
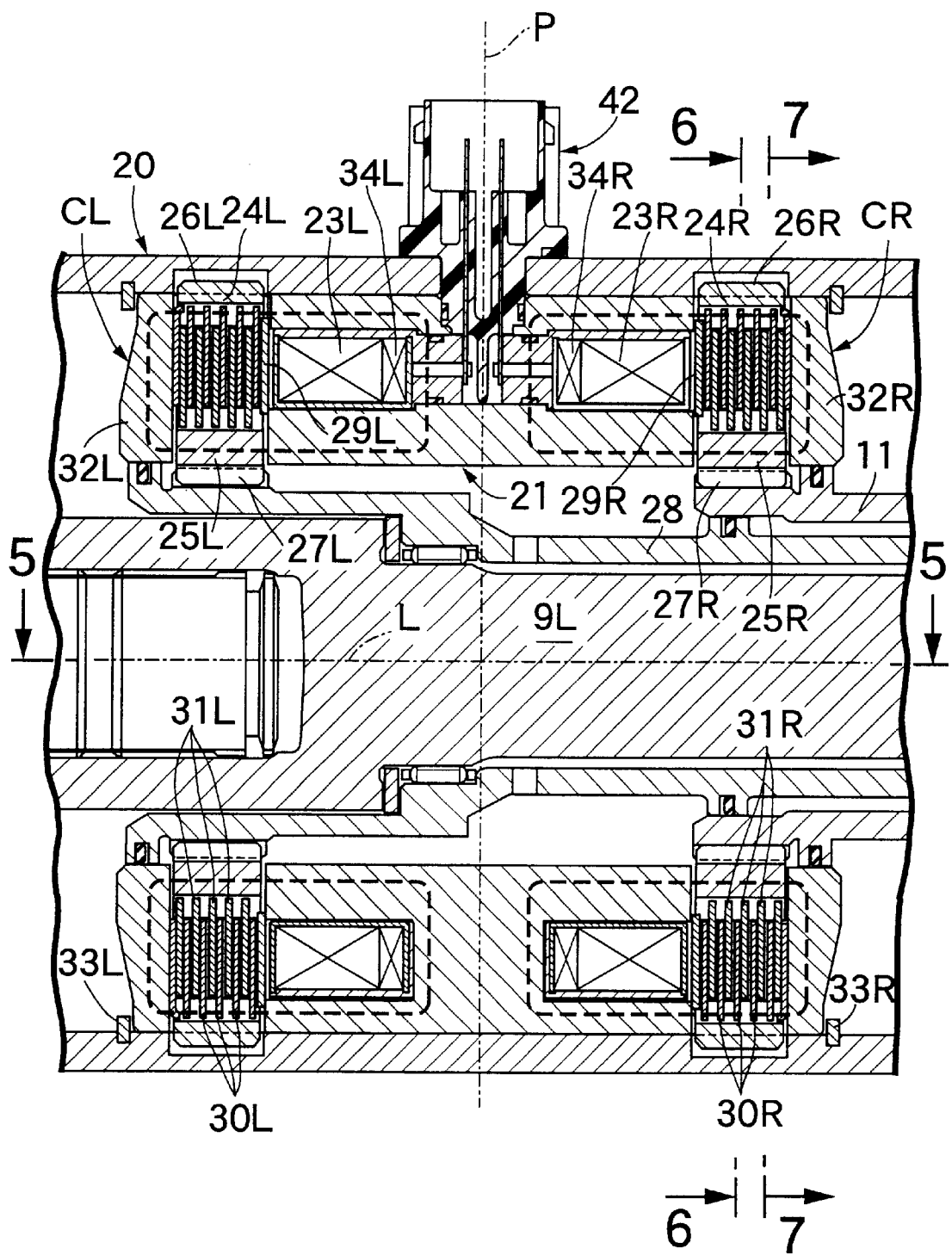
FIG. 4 is a magnified sectional view of the essential part in FIG. 1.
Figure 5:
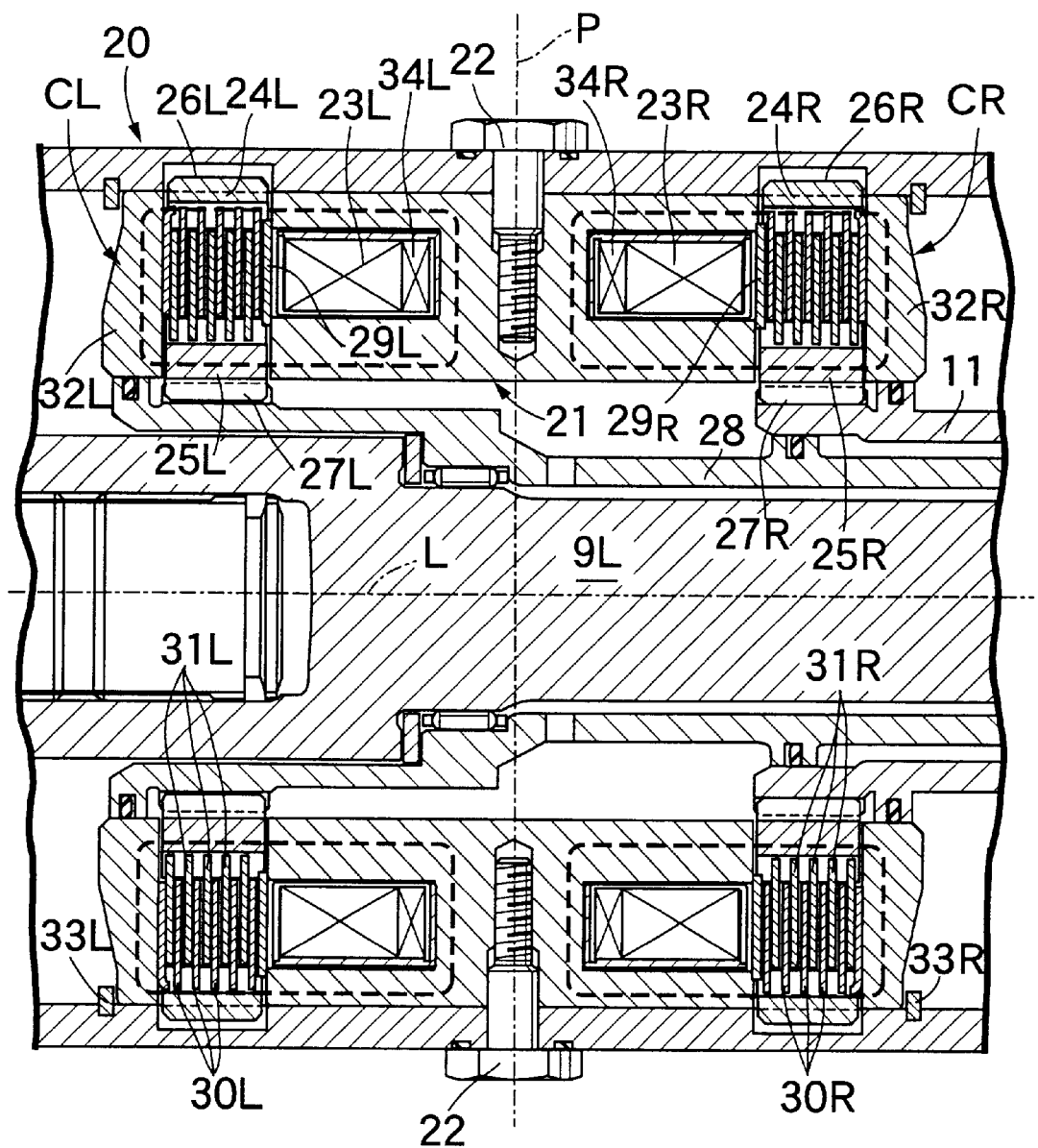
FIG. 5 is a cross-sectional view at line 5—5 in FIG. 4.
Figure 6:
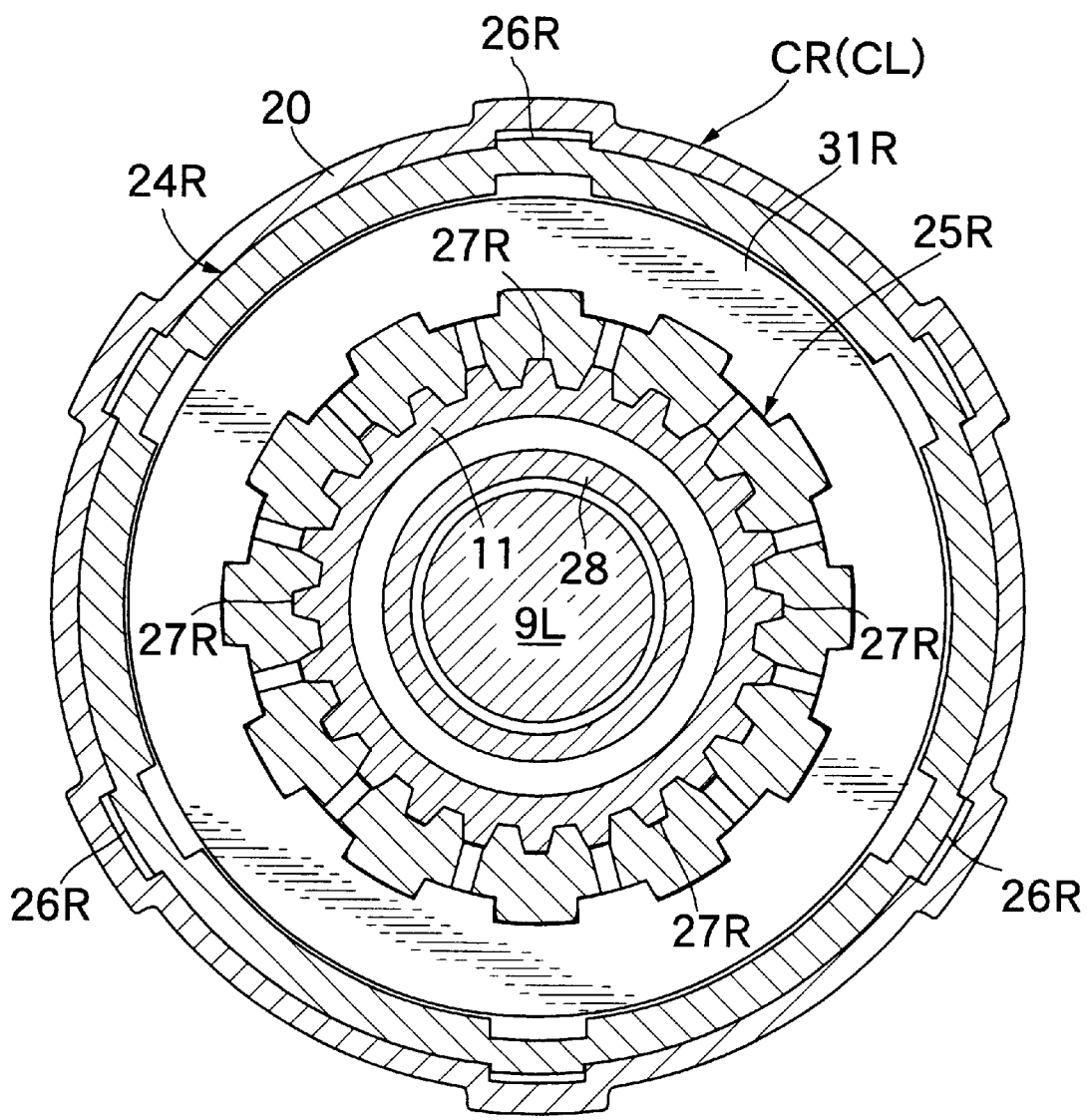
FIG. 6 is a cross-sectional view at line 6—6 in FIG. 4.
Figure 7:
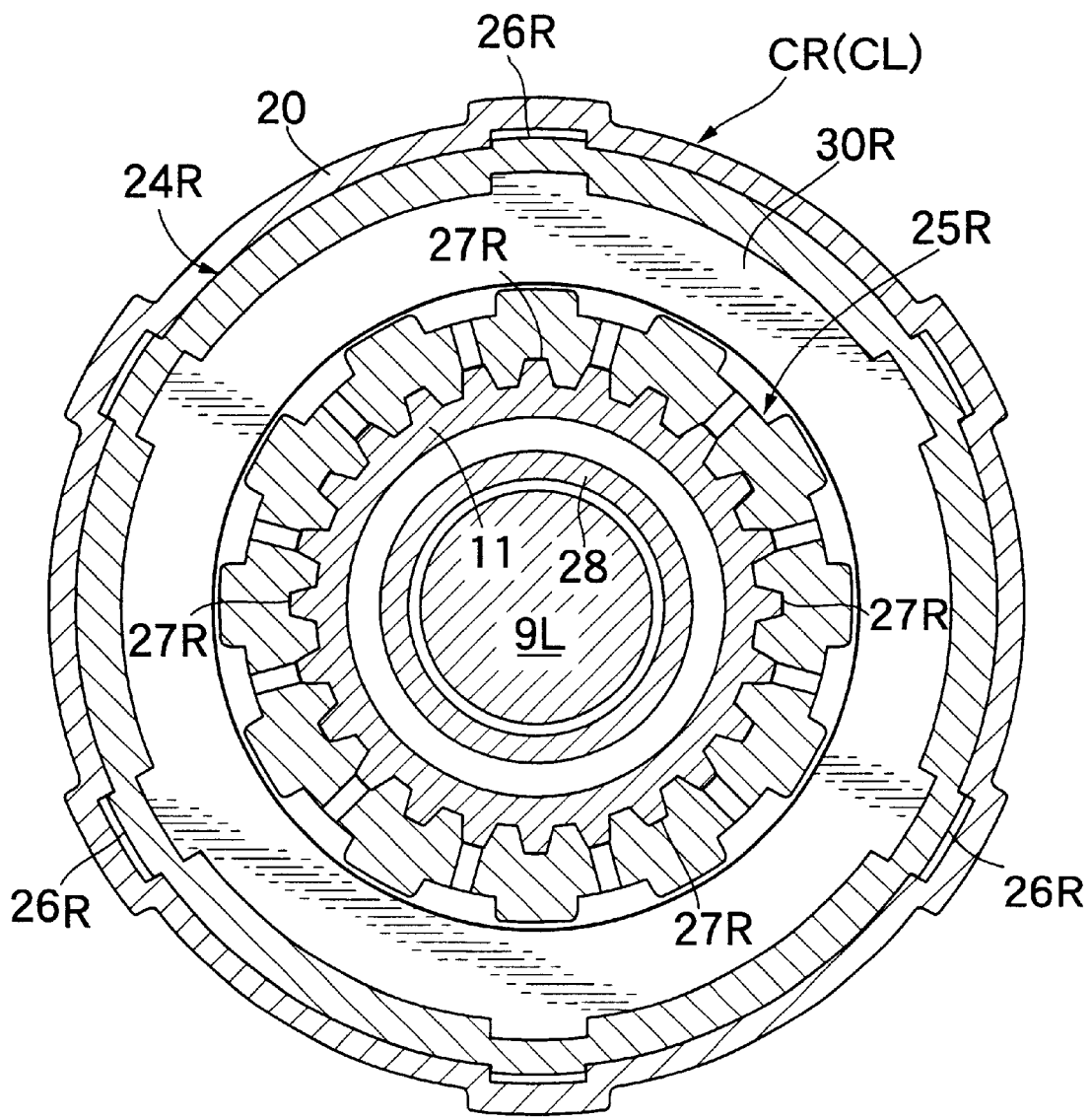
FIG. 7 is a cross-sectional view at line 7—7 in FIG. 4.

Thus, when power is applied to the excitation coil 23L so as to engage the left electromagnetic clutch CL in response to a command from the electronic control unit U, as shown by the broken lines in FIGS. 4 and 5, a magnetic flux is formed along a closed magnetic circuit comprising the core 21, the outer guide 24L, the armature 32L and the inner guide 25L that are made from magnetic materials, and the armature 32L is attracted rightward towards the excitation coil 23L. As a result, the outer discs 30L . . . and inner discs 31L . . . which are interposed between the armature 32L and the pressure plate 29L are thrust by the armature 32L so as to come in close contact with each other, and the sleeve 28 which is integral with the third sun gear 19 is connected to the housing 20 thus engaging the left electromagnetic clutch CL.

Similarly, when power is applied to the excitation coil 23R so as to engage the right electromagnetic clutch CR in response to a command from the electronic control unit U, as shown by the broken lines in FIGS. 4 and 5, a magnetic flux is formed along a closed magnetic circuit comprising the core 21, the outer guide 24R, the armature 32R and the inner guide 25R that are made from magnetic materials, and the armature 32R is attracted leftward towards the excitation coil 23R. As a result, the outer discs 30R * and inner discs 31R . . . which are interposed between the armature 32R and the pressure plate 29R are thrust by the armature 32R so as to come in close contact with each other, and the carrier member 11 is connected to the housing 20 thus engaging the right electromagnetic clutch CR.

When a magnetic flux is thus formed due to excitation of the excitation coil 23L of the left electromagnetic clutch CL or excitation of the excitation coil 23R of the right electromagnetic clutch CR, since the outer discs 30R . . . and 30L . . . and the inner discs 31R . . . and 31L . . . are all made from non-magnetic materials, a short circuit of the magnetic flux through these outer discs 30R . . . and 30L . . . and inner discs 31R . . . and 31L . . . can be avoided and the armatures 32R and 32L can thus be attracted reliably.

When the armature 32L moves rightward due to excitation of the excitation coil 23L of the left electromagnetic clutch CL so making the outer discs 30L . . . and the inner discs 31L . . . come into close contact with each other, there is a small air gap between the right hand face of the armature 32L and the left-hand faces of the outer guide 24L and inner guide 25L. Similarly, when the armature 32R moves leftward due to excitation of the excitation coil 23R of the right electromagnetic clutch CR so making the outer discs 30R . . . and the inner discs 31R . . . come into close contact with each other, there is a small air gap between the left-hand face of the armature 32R and the right hand faces of the outer guide 24R and inner guide 25R. Therefore, the thrusts of the armatures 32R and 32L can be transmitted reliably to the outer discs 30R . . . and 30L . . . and the inner discs 31R . . . and 31L . . . .

As the clutch facings bonded to the inner discs 31R . . . and 31L . . . wear due to long-term use, the aforementioned air gaps gradually decrease, the right hand face of the armature 32L comes into close contact with the left-hand faces of the outer guide 24L and inner guide 25L when the excitation coil 23L is excited, and the left had face of the armature 32R comes into close contact with the right hand faces of the outer guide 24R and inner guide 25R when the excitation coil 23R is excited. Therefore, if it is arranged that the aforementioned air gaps disappear before the clutch facings are completely worn, the outer discs 30R . . . and 30L . . . and the inner discs 31R . . . and 31L . . . can be prevented from being pressed against each other in a state in which the clutch facings are completely worn so causing burning.

As described above, since the torques distributed between the right and left front wheels WFR and WFL are determined by the engagement forces of the right and left electromagnetic clutches CR and CL, in order to distribute the desired torques between the right and left front wheels WFR and WFL, it is necessary to detect the engagement forces generated by the right and left electromagnetic clutches CR and CL and carry out feedback control of the duty ratio of the excitation current I fed to the excitation coils 23R and 23L on the basis of the above-mentioned engagement forces. The engagement forces of the right and left electromagnetic clutches CR and CL depend on the thrusts applied to the armatures 32R and 32L in the axial direction, and these thrusts in the axial direction depend on the magnetic flux densities generated by the excitation coils 23R and 23L. Therefore, the engagement force of the left electromagnetic clutch CL can be detected by detecting the magnetic flux density generated by the left-hand excitation coil 23L, and the engagement force of the right electromagnetic clutch CR can be detected by detecting the magnetic flux density generated by the right-hand excitation coil 23R. The magnetic flux densities generated by the right and left excitation coils 23R and 23L are detected by the right and left search coils 34R and 34L respectively.

Figure 8:
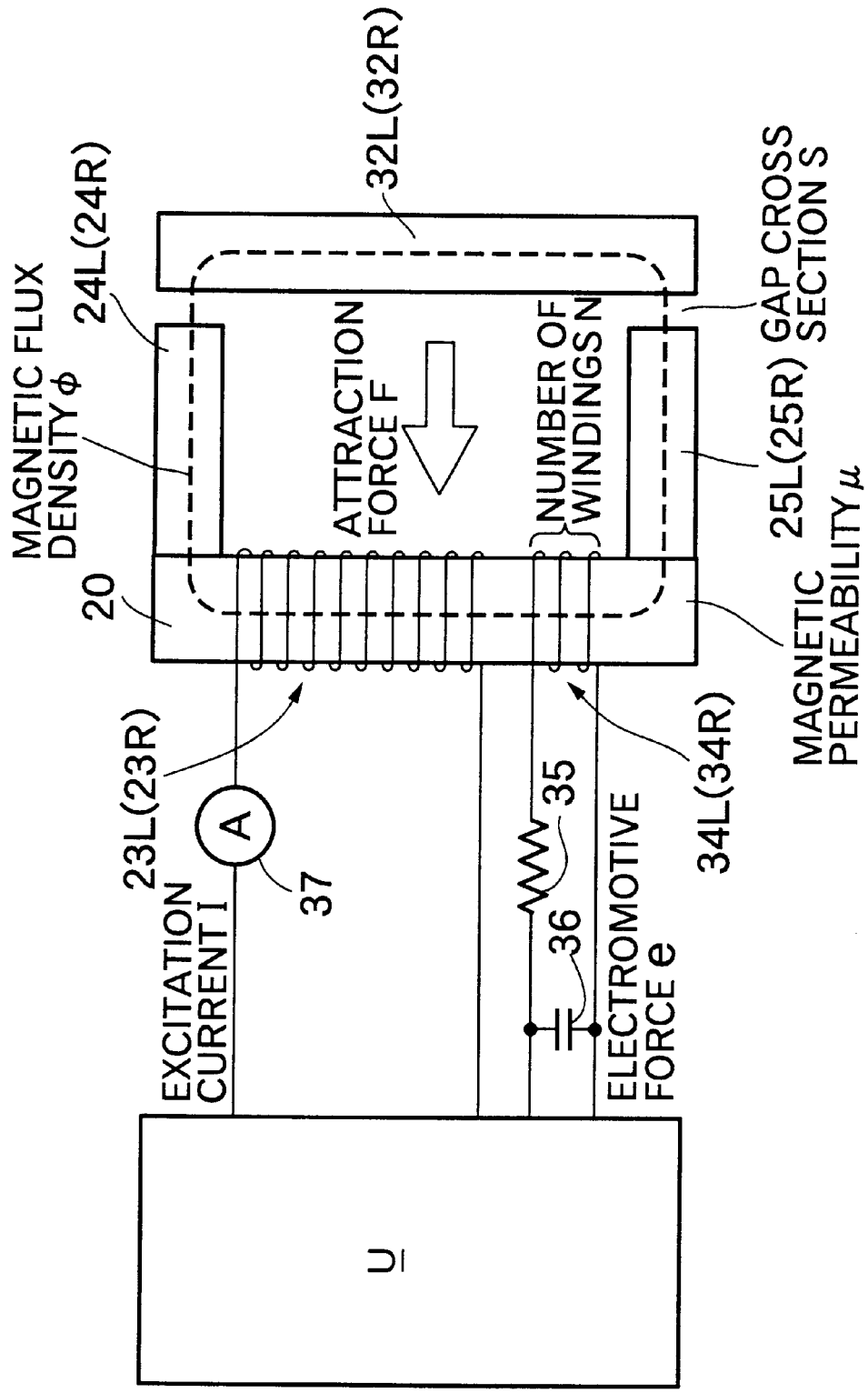
FIG. 8 is a diagram for explaining a method of detecting the main magnetic flux density of an electromagnetic clutch.

As shown in FIG. 8, since a magnetic flux density $\phi$ is generated along the magnetic circuit formed by the core 20, the outer guide 24R or 24L, the armature 32R or 32L and the inner guide 25R or 25L when either of the excitation coils 23R and 23L is excited by an excitation current I, an induced electromotive force e is generated in the search coil 34R or 34L wound in the core 21 in response to the percentage change of the magnetic flux density $\phi$. The induced electromotive force e generated in the search coil 34R or 34L is input into the electronic control unit U, and the magnetic flux density $\phi$ generated by the excitation coil 23R or 23L is calculated based on the induced electromotive force e. In order to remove noise surrounding the induced electromotive force e, a filter comprising a resistor 35 and a condenser 36 is provided in the circuit which connects the excitation coil 23R or 23L to the electronic control unit U. The above-mentioned excitation current I is detected by current detecting means 37 and 37 which are provided on the right and left electromagnetic clutches CR and CL respectively.

The induced electromotive force e detected by each of the search coils 34R and 34L, the number of windings N of each of the search coils 34R and 34L, and the time-differential $d\phi/dt$ of the magnetic flux density $\phi$ generated by each of the excitation coils 23R and 23L establish the relationship represented by the equation below (Faraday's law).

$$e = N(d\phi/dt) \quad (3)$$

Therefore, the magnetic flux density $\phi$ can be calculated by integrating the time-differential $d\phi/dt$ of the magnetic flux density $\phi$ in the above-mentioned equation (3) over time.

$$\phi = (1/N) \int e\, dt + C \quad (4)$$

Here, C is a constant of integration. Thus, the magnetic flux density $\phi$ generated by the excitation of the excitation coil 23R or 23L of the electromagnetic clutch CR or CL can be detected simply and at low cost without using an expensive magnetic flux density detecting means comprising a Hall element.

Once the magnetic flux density $\phi$ is so calculated, the attraction force F applied to the armature 32R or 32L is given by the equation below using the magnetic permeability $\mu$ and the air gap cross section S between the outer guide 24R or 24L/inner guide 25R or 25L and the armature 32R or 32L.

$$F = \phi^2/(2\mu S) \quad (5)$$

The control system for the right and left electromagnetic clutches CR and CL is explained below.

Figure 9:
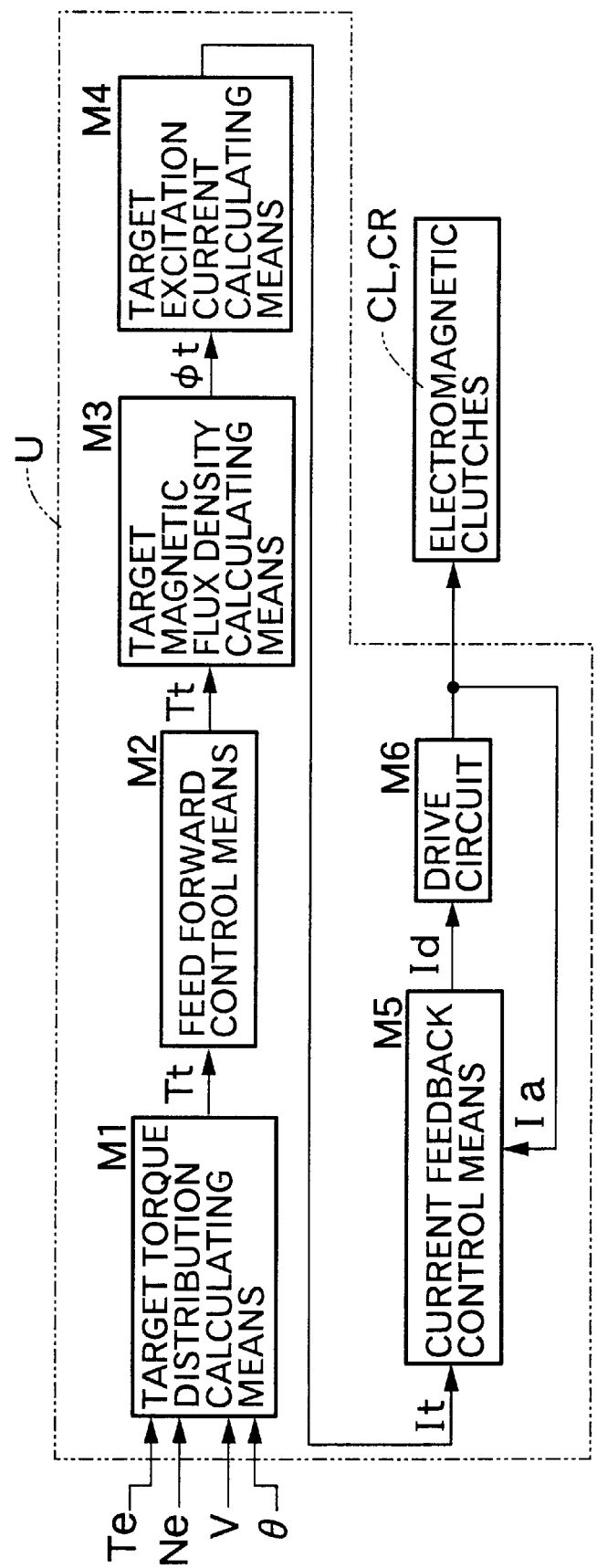
FIG. 9 is a block diagram of the control system.

As is clear from FIG. 9, the electronic control unit U comprises target torque distribution calculating means M1, feed forward control means M2, target magnetic flux density calculating means M3, target excitation current calculating means M4, current feedback control means M5 and drive circuit M6.

The target torque distribution calculating means M1 calculates target torque distributions Tt to the right and left front wheels WFR and WFL based on the driving conditions of the vehicle, that is to say, the engine torque Te, engine rotational rate Ne, vehicle speed V, steering angle θ, etc. The feed forward control means M2 corrects the target torque distributions Tt by adding their differential components thereto and outputs them. The target magnetic flux density calculating means M3 converts the target torque distributions Tt output from the feed forward control means M2 into target magnetic flux densities $\phi t$ that are to be generated by the excitation coils 23R and 23L of the electromagnetic clutches CR and CL. Since there is a certain relationship between the torque distribution T and the magnetic flux density $\phi$ according to the type of electromagnetic clutches CR and CL, the target magnetic flux density $\phi t$ can be looked up from the target torque distribution Tt by mapping the relationship beforehand.

Subsequently, the target excitation current calculating means M4 calculates a target excitation current It that is to be applied to the excitation coil 23R or 23L of the electromagnetic clutch CR or CL based on the target magnetic flux density $\phi t$ output from the target magnetic flux density calculating means M3. At this time, a correction according to the change in size of the air gap between the outer guide 24R or 24L/inner guide 25R or 25L and the armatures 32R and 32L is carried out. That is to say, the above-mentioned air gap is large in the initial state in which the outer discs 30R . . . or 30L . . . and inner discs 31R . . . or 31L . . . which are the frictional engagement members of the electromagnetic clutches CR and CL are unworn, but the above-mentioned air gaps gradually decrease accompanying the wear of the above-mentioned frictional engagement members. With the same level of excitation current I applied to the excitation coil 23R or 23L, when the air gap is large the engagement force is small so reducing the torque transmission, when the air gap is small the engagement force becomes large so increasing the torque transmission, and the torque transmission. That is, the torque transmission varies according to the term of use.

Figure 10:
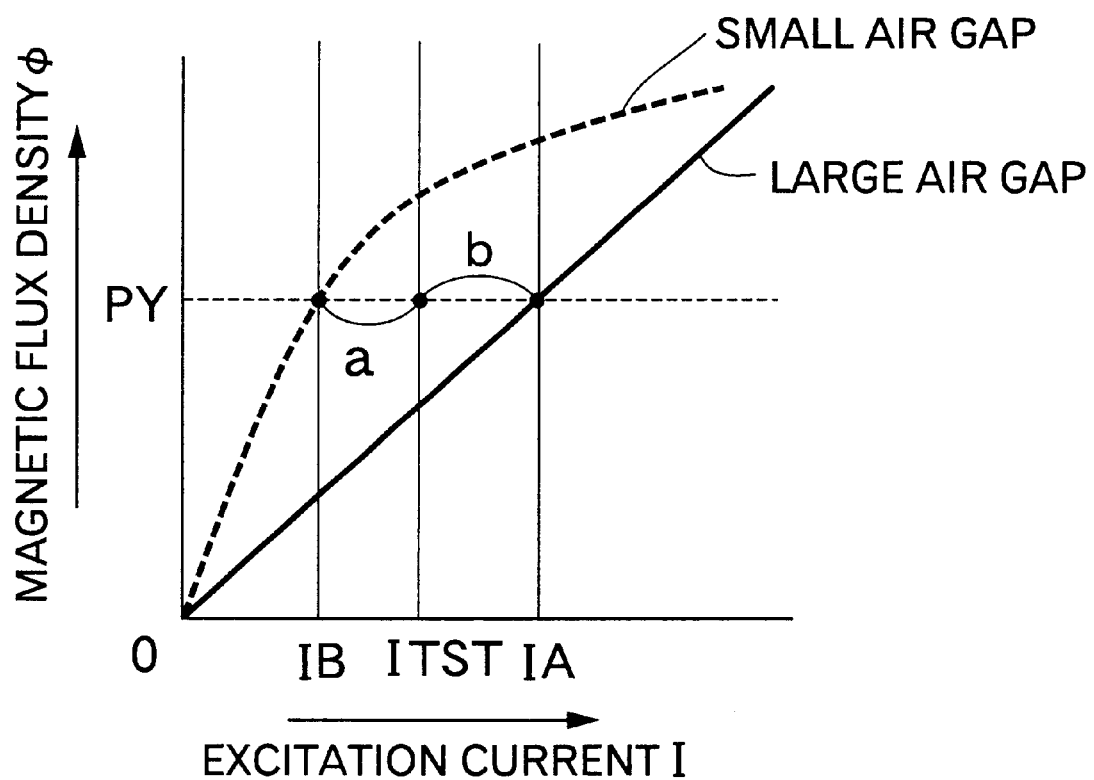
FIG. 10 is a graph showing the relationship between the excitation current I and the magnetic flux density $\phi$.

In the present embodiment, as shown in the graph of FIG. 10 the relationship between the excitation current I which is the abscissa and the magnetic flux density $\phi$ which is the ordinate is stored in the electronic control unit U beforehand for two cases, that is to say, a case (initial state) in which the air gap is large and a case (worn state) in which the air gap is small. When torque distribution control is not being carried out such as when the system is started, the excitation current I=ITST at which the magnetic flux density $\phi$ detected by the search coil 34R or 34L becomes PY is detected by the current detecting means 37 while applying current to the excitation coil 23R or 23L.

Since it is known beforehand that when the air gap is large the excitation current I at which the magnetic flux density $\phi$ equals PY is IA, and when the air gap is small the excitation current I at which the magnetic flux density $\phi$ equals PY is IB, a deviation 'a' between ITST and IB and a deviation 'b' between IA and ITST can be calculated. The larger the air gap (the closer to the initial state), the larger the value 'a' and the smaller the value 'b', the smaller the air gap (the closer to the worn state), the smaller the value 'a' and the larger the value 'b', and the size of air gap can therefore be estimated according to the ratio between value 'a' and value 'b'.

Figure 11:
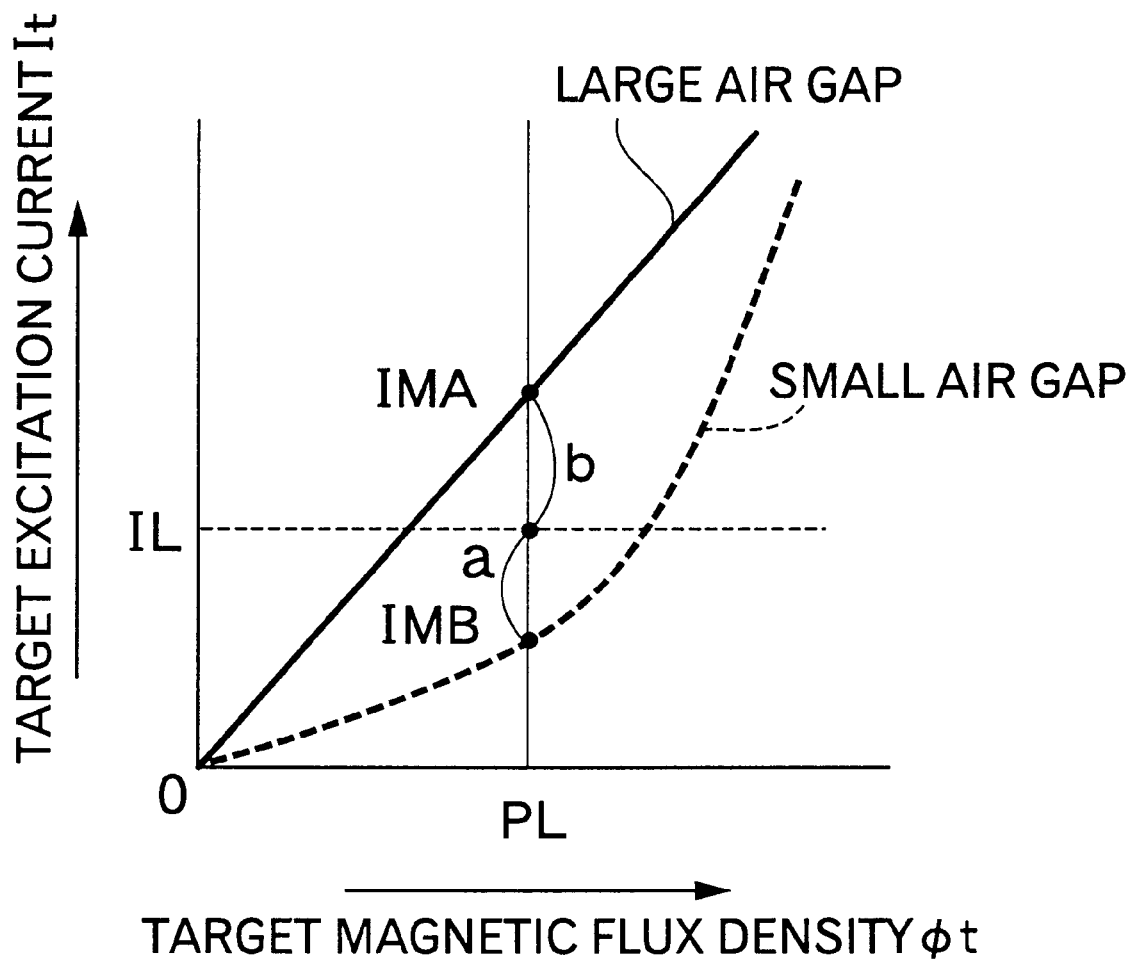
FIG. 11 is a graph showing the relationship between the target magnetic flux density $\phi t$ and the target excitation current It.

The graph of FIG. 11 shows the inverse function of the graph of FIG. 10, and the relationship between the target magnetic flux density $\phi t$ which is the abscissa and the target excitation current It which is the ordinate is stored beforehand in the electronic control unit U for two cases, that is to say, a case (initial state) in which the air gap is large and a case (worn state) in which the air gap is small. The target excitation current calculating means M4 calculates the target excitation current It by applying the target magnetic flux density $\phi t$ output from the aforementioned target magnetic flux density calculating means M3 to the map of FIG. 11. In detail, when the target magnetic flux density $\phi t$ is PL, the corresponding target excitation current It=IMA in the case of a large air gap and the corresponding target excitation current It=IMB in the case of a small air gap are looked up, and the target excitation current It=IL corresponding to the target magnetic flux density $\phi t$=PL can be calculated by distributing the deviation between IMA and IMB proportionally according to the above-mentioned values 'a' and 'b'.

$$IL = IMA - (IMA - IMB) \times (IA - ITST)/(IA - IB)$$

The target excitation current It thus calculated by the target excitation current calculating means M4 is input into the current feedback control means M5. Based on the deviation $\Delta I(=It-Ia)$ between the aforementioned target excitation current It and the actual excitation current Ia detected by the current detecting means 37, the current feedback control means M5 outputs to the drive circuit M6 an excitation command current Id for converging the deviation ΔI to 0, and the drive circuit M6 applies a current to the excitation coils 23R and 23L based on the excitation command current Id. In accordance with this current feedback control, the electromagnetic clutches CR and CL are driven by the aforementioned target excitation current It and generate the target torque distributions Tt that have been calculated by the target torque distribution calculating means M1.

Thus, even when the frictional engagement members of the electromagnetic clutches CR and CL are worn over time so decreasing the air gaps, the target excitation current It can be determined precisely from the current target magnetic flux densities φ at that time. Moreover, since there is no need for the magnetic flux density detecting means used at this time to detect dynamic changes in the magnetic flux density, inexpensive devices such as search coils 34R and 34L can be used instead so contributing to a reduction in the cost. Since the precise target excitation current It can be calculated according to the state of wear of the frictional engagement members of the electromagnetic clutches CR and CL, it is unnecessary to employ the magnetic flux density feedback control which has been needed in the art, so simplifying the control system.

Next, a second embodiment of the present invention is explained below by reference to FIGS. 12 and 13.

With regard to the target excitation current calculating means M4, the second embodiment is different from the first embodiment in terms of the method for calculating the target excitation current It from the target magnetic flux density φt output from the target magnetic flux density calculating means M3.

Figure 12:
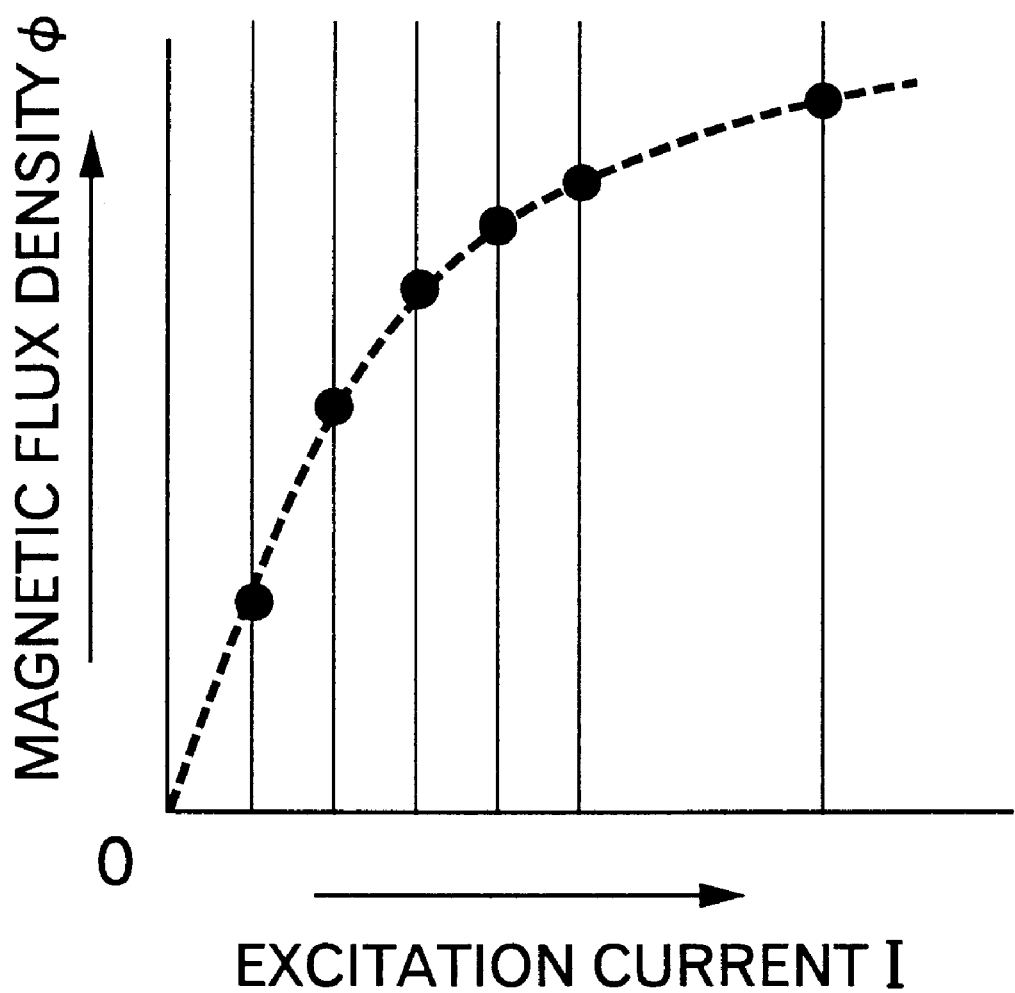
FIG. 12 is a graph showing the relationship between the excitation current I and the magnetic flux density 4 according to a second embodiment of the present invention.
Figure 13:
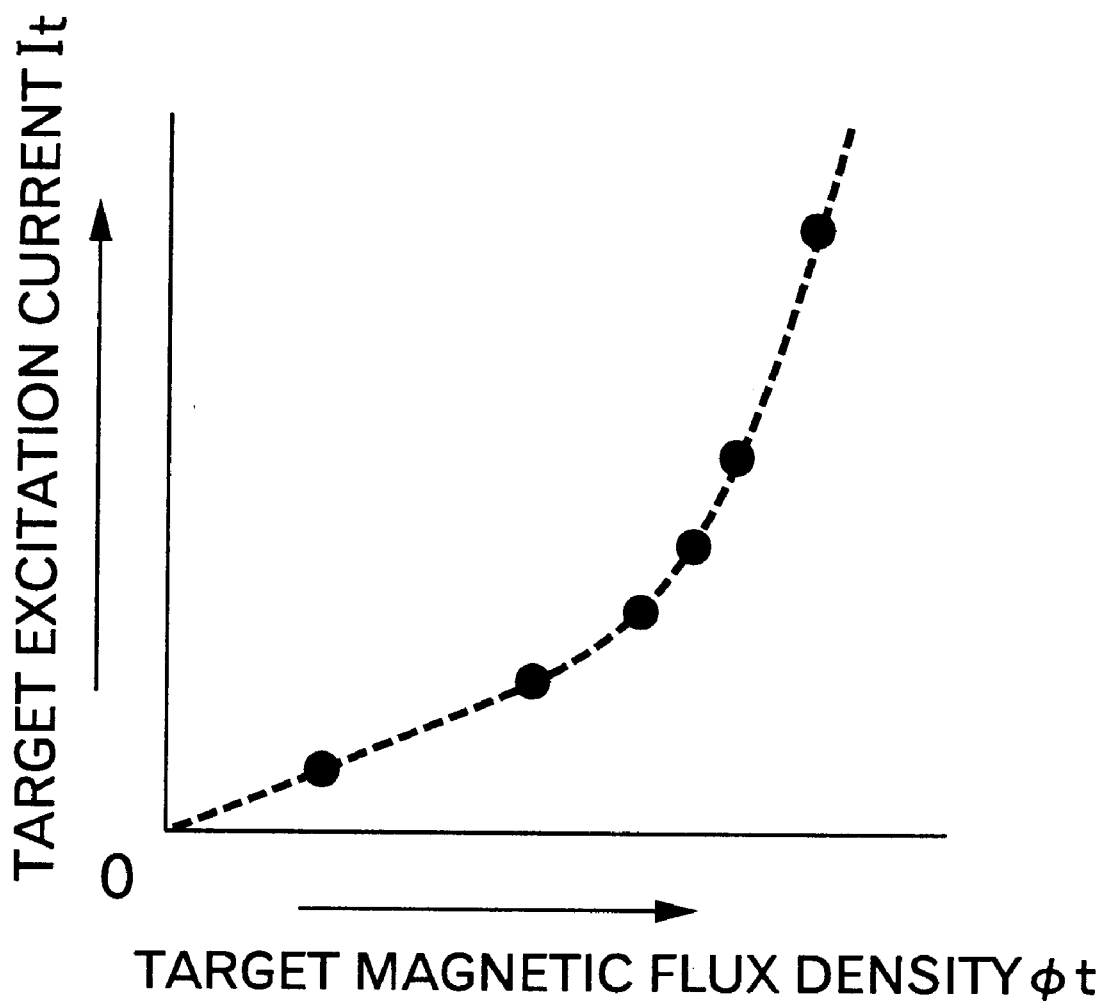
FIG. 13 is a graph showing the relationship between the target magnetic flux density $\phi t$ and the target excitation current It according to the second embodiment of the present invention.

That is to say, as shown in the graph of FIG. 12, when torque distribution control is not being carried out, for example, when the system is started, the excitation current I is applied at multiple different levels (6 levels in the embodiment) to the excitation coil 23R or 23L, the corresponding magnetic flux density φ is detected by the search coil 34R or 34L, and thus the relationship between the excitation current I and the magnetic flux densities φ corresponding to the size of the air gap at that time, that is to say, the function of the magnetic flux density φ which is the ordinate relative to the excitation current I which is the abscissa is determined. The graph of FIG. 13 shown the inverse function of the graph of FIG. 12, and the target excitation current It which is the ordinate is expressed as a function of the target magnetic flux density φt which is the abscissa. Therefore, the target excitation current calculating means M4 can calculate the target excitation current It corresponding to the size of the air gap at that time by applying the target magnetic flux density φt output from the target magnetic flux density calculating means M3 to the graph of FIG. 13.

In accordance with the second embodiment, since it is unnecessary to store a map showing the relationship between the excitation current I and the magnetic flux density φ (see. FIG. 10) and a map showing the relationship between the target magnetic flux density φt and the target excitation current It (see. FIG. 11), which was required in the first embodiment, the control system is further simplified.

As hereinbefore described, in accordance with the invention, since the relationship between the excitation current and the magnetic flux density is determined from the magnetic flux detected by the magnetic flux density detecting means while applying a predetermined excitation current when the electromagnetic clutches are not controlled, a target magnetic flux density corresponding to the target engagement force can be converted into a target excitation current using the relationship when the electromagnetic clutches are controlled. Therefore, when the frictional engagement members of the electromagnetic clutches are worn over time so decreasing the air gaps, the target excitation current can be determined precisely from the target current magnetic flux densities at that time, and the engagement force can be precisely controlled while eliminating the conventionally needed magnetic flux density feedback control so simplifying the control system. Moreover, since there is no need for the above-mentioned magnetic flux density detecting means to detect dynamic changes in the magnetic flux density, inexpensive devices such as, for example, search coils can be used instead so contributing to a reduction in the cost.

The embodiments of the present invention have been described in detail above, but the present invention can be modified in a variety of ways without departing from the spirit and scope of the invention.

For example, in the present embodiments, the present invention is applied to a driving force distribution device which distributes the torque between right and left driving wheels, but it is possible to apply the present invention to a driving force distribution device which distributes the torque between front and rear driving wheels.

We claim:

1. A driving force distribution device for a vehicle comprising;

magnetic flux density detecting means for detecting a magnetic flux density which flows in electromagnetic clutches, current detecting means for detecting an excitation current which flows in the electromagnetic clutches, and control means for determining target engagement forces of the electromagnetic clutches and controlling the engagement forces of the electromagnetic clutches, distribution of the driving force being carried out between driving wheels of the vehicle by means of the electromagnetic clutches, wherein the control means determines a relationship between the excitation current and the magnetic flux density based on the magnetic flux density detected by the magnetic flux density detecting means when a predetermined excitation current is applied to the electromagnetic clutches when the clutches are not being controlled for driving force distribution, converts a target magnetic flux density corresponding to the target engagement force into a target excitation current based on the determined relationship between the excitation current and the magnetic flux density when the electromagnetic clutches are controlled for force distribution, and carries out current feedback control so that the excitation current flowing in the electromagnetic clutches detected by the current detecting means converges to the target excitation current.

2. A driving force distribution device for a vehicle according to claim 1, wherein said magnetic flux detecting means comprises search coils associated with said electromagnetic clutches, respectively.

3. A driving force distribution device for a vehicle according to claim 1, wherein said target engagement forces are determined based on sensed driving conditions of the vehicle.

4. A driving force distribution device for a vehicle according to claim 1, wherein said relationship between the excitation current and the magnetic flux density is determined based on comparison of the magnetic flux density detected by the magnetic flux density detecting means when the predetermined excitation current is applied to the electromagnetic clutches when the clutches are not being controlled for driving force distribution, and predetermined relationships between the predetermined excitation current and detected magnetic flux densities for the electromagnetic clutches in worn and unworn states thereof.

5. A driving force distribution device for a vehicle according to claim 1, wherein said relationship between the excitation current and the magnetic flux density is determined by applying multiple different predetermined excitation currents to the electromagnetic clutches when the electromagnetic clutches are not controlled for driving force distribution and detecting magnetic flux densities corresponding to each of the applied multiple different predetermined excitation currents.

6. A driving force distribution device for a vehicle in which distribution of the driving force is carried out between driving wheels of the vehicle through electromagnetic clutches, the distribution device comprising:

magnetic flux density detecting means for detecting a magnetic flux density which flows in the electromagnetic clutches;

current detecting means for detecting an excitation current which flows in the electromagnetic clutches; and control means for determining target engagement forces of the electromagnetic clutches and controlling the engagement forces of the electromagnetic clutches;

wherein the control means determines a state of wear of the electromagnetic clutches, corrects a target magnetic flux density corresponding to the target engagement force based on the determined state of wear of the electromagnetic clutches, converts the corrected target magnetic flux density into a target excitation current when the electromagnetic clutches are controlled for force distribution, and carries out current feedback control so that the excitation current flowing in the electromagnetic clutches detected by the current detecting means converges to the corrected target excitation current.

7. A driving force distribution device for a vehicle according to claim 6, wherein said control means determines the state of wear of the electromagnetic clutches by determining a relationship between the excitation current and the magnetic flux density based on the magnetic flux density detected by the magnetic flux density detecting means when a predetermined excitation current is applied to the electromagnetic clutches when the clutches are not being controlled for driving force distribution, and said control means corrects the target magnetic flux density by converting the target magnetic flux density corresponding to the target engagement force into a target excitation current using the determined relationship between the excitation current and the magnetic flux density when the electromagnetic clutches are controlled for force distribution.

8. A driving force distribution device for a vehicle according to claim 6, wherein said magnetic flux detecting means comprises search coils associated with said electromagnetic clutches, respectively.

9. A driving force distribution device for a vehicle according to claim 6, wherein said target engagement forces are determined based on sensed driving conditions of the vehicle.

10. A driving force distribution device for a vehicle according to claim 7, wherein said relationship between the excitation current and the magnetic flux density is determined based on comparison of the magnetic flux density detected by the magnetic flux density detecting means when the predetermined excitation current is applied to the electromagnetic clutches and the clutches are not controlled for driving force distribution, and predetermined relationships between the predetermined excitation current and detected magnetic flux densities for the electromagnetic clutches in worn and unworn states thereof.

11. A driving force distribution device for a vehicle according to claim 7, wherein said relationship between the excitation current and the magnetic flux density is determined by applying multiple different predetermined excitation currents to the electromagnetic clutches when the electromagnetic clutches are not controlled for driving force distribution and detecting magnetic flux densities corresponding to each of the applied multiple different predetermined excitation currents.

12. A driving force distribution device for a vehicle comprising:

a magnetic flux density detector which detects magnetic flux density flowing in electromagnetic clutches;

a current detector which detects excitation current flowing in the electromagnetic clutches; and a controller which determines target engagement forces of the electromagnetic clutches and controls the engagement forces of the electromagnetic clutches, distribution of the driving force being carried out between driving wheels of the vehicle through the electromagnetic clutches, wherein the controller determines a relationship between the excitation current and the magnetic flux density based on the magnetic flux density detected by the magnetic flux density detector when a predetermined excitation current is applied to the electromagnetic clutches when the clutches are not being controlled for driving force distribution, converts a target magnetic flux density corresponding to the target engagement force into a target excitation current based on the determined relationship between the excitation current and the magnetic flux density when the electromagnetic clutches are controlled for force distribution, and carries out current feedback control so that the excitation current flowing in the electromagnetic clutches detected by the current detector converges to the target excitation current.

13. A driving force distribution device for a vehicle according to claim 12, wherein said magnetic flux detector comprises search coils associated with said electromagnetic clutches, respectively.

14. A driving force distribution device for a vehicle according to claim 12, wherein said target engagement forces are determined based on sensed driving conditions of the vehicle.

15. A driving force distribution device for a vehicle according to claim 12, wherein said relationship between the excitation current and the magnetic flux density is determined based on comparison of the magnetic flux density detected by the magnetic flux density detector when the predetermined excitation current is applied to the electromagnetic clutches when the clutches are not being controlled for driving force distribution, and predetermined relationships between the predetermined excitation current and detected magnetic flux densities for the electromagnetic clutches in worn and unworn states thereof.

16. A driving force distribution device for a vehicle according to claim 12, wherein said relationship between the excitation current and the magnetic flux density is determined by applying multiple different predetermined excitation currents to the electromagnetic clutches when the electromagnetic clutches are not controlled for driving force distribution and detecting magnetic flux densities corresponding to each of the applied multiple different predetermined excitation currents.

* * * * *

UNITED STATES PATENT AND TRADEMARK OFFICE
CERTIFICATE OF CORRECTION

PATENT NO.    : 6,543,595 B2
DATED         : April 8, 2003
INVENTOR(S)   : S. Okuma It is certified that error appears in the above-identified patent and that said Letters Patent is hereby corrected as shown below:

Column 3,
Line 30, change "density 4" to -- density ø --.

Column 7,
Line 53, change "*" to -- ... -- .

Column 8,
Line 22, change "had" to -- hand --.

Column 10,
Line 14, change ", and the " to a period.
Line 15, delete "torque transmission." (at the start of the line).

Column 11,
On the line that is printed between where line numbers 43 and 44 would be (but not on the same line with either line number 43 or line number 44 because the text is out of alignment with the line numbers here), change "shown" to -- shows --.

Column 12,
Line 26, change ";" to -- : --.

Signed and Sealed this

Eighth Day of July, 2003

JAMES E. ROGAN
*Director of the United States Patent and Trademark Office*